United States Patent
Westman et al.

(10) Patent No.: US 6,236,836 B1
(45) Date of Patent: May 22, 2001

(54) TRANSPONDER SYSTEM FOR LOCALIZATION OF AN OBJECT

(76) Inventors: Tony Westman; Anne Närhi, both of S:t Persgatan 7, S-753 20 Uppsala (SE)

(*) Notice: Subject to any disclaimer, the term of this patent is extended or adjusted under 35 U.S.C. 154(b) by 0 days.

(21) Appl. No.: 08/325,448
(22) PCT Filed: May 10, 1993
(86) PCT No.: PCT/SE93/00410
   § 371 Date: Oct. 31, 1994
   § 102(e) Date: Oct. 31, 1994
(87) PCT Pub. No.: WO93/23766
   PCT Pub. Date: Nov. 25, 1993

(30) Foreign Application Priority Data

May 11, 1992 (SE) .................................................. 9201481

(51) Int. Cl.[7] .............................. H04B 7/00; H04Q 7/20
(52) U.S. Cl. .................. 455/38.3; 455/11.1; 455/31.3; 455/426; 455/574; 342/457; 340/991
(58) Field of Search ................... 379/56, 57, 58; 342/457; 340/988, 989, 991; 455/38.3, 343, 31.2, 31.3, 456–458, 419, 427, 11.1, 426, 574

(56) References Cited

U.S. PATENT DOCUMENTS

| | | | |
|---|---|---|---|
| 4,742,357 | * | 5/1988 | Rackley ............................... 342/457 |
| 4,908,629 | | 3/1990 | Apsell et al. . |
| 5,021,794 | | 6/1991 | Lawrence . |
| 5,032,845 | | 7/1991 | Velasco . |
| 5,051,741 | | 9/1991 | Wesby . |
| 5,128,938 | * | 7/1992 | Borras .............................. 455/343 X |
| 5,247,700 | * | 9/1993 | Wohl et al. ......................... 455/33.1 |
| 5,355,511 | * | 10/1994 | Hatano et al. ..................... 455/11.1 |

FOREIGN PATENT DOCUMENTS

| | | |
|---|---|---|
| 0467036A2 | 1/1992 | (EP) . |
| 2155720 | 9/1985 | (GB) . |
| 9119 997 | 12/1991 | (WO) . |

OTHER PUBLICATIONS

"Kit Corner: The DSE Radio Direction Finder", '73 Amateur Radio—Jul. 1986—pp. 64–66.

* cited by examiner

Primary Examiner—Nay Maung
(74) Attorney, Agent, or Firm—Young & Thompson

(57) ABSTRACT

A transponder system is provided which presents a light weight portable or mobile system for localization of movable objects, e.g., for surveillance of valuable transports and the like. The small unit constituting the transponder contains a receiver (1) of paging type, a decoder (2), a logic unit (3), a transmitter portion (10), a built-in antenna and power supply (11). The system is controllable by an existing tested radio system for paging. One advantage of utilizing an already existing paging system is that functionality is well tested and a general covering range is obtained. In addition, costs for building up and operation of a paging system are eliminated. Control information being sent to the transponder includes a number of symbols defining a certain basic function for the built-in marker transmitter (10) and symbols which constitute control code and control data for the specific function. Consequently at least the frequency, transmit power and transmitting sequences of the marker transmitter are controllable.

20 Claims, 4 Drawing Sheets

TRANSPONDER SYSTEM FOR LOCALIZATION OF AN OBJECT

TECHNICAL FIELD

The present invention relates to a portable/mobile transponder for the localizing of movable objects and more exactly the transponder according to the present invention is possible to be enabled via an existing radio network, e.g. type MiniCall and/or MBS-RDS.

PRIOR ART

Today a frequent problem consists in thefts whereby there is no simple way to easily locate these objects. In certain cases, e.g., in the transportation of valuables, cassettes are used which contain a system such that if the cassette is unauthorizedly opened a device is triggered for example staining the banknotes. These systems are however not suitable for larger transports of valuables, nor are they suitable for other individual objects of value.

Therefore in the surveillance of objects which are easily being moved there exists a general demand for a marker transmitter, which for example, is possible to enable if the object to be guarded is brought out of a surveillance area. Such a marker or transponder then must be of small size, self supporting and capable of being applied to or inside the objects which are of interest to track.

By means of such a marker device or transponder, for example, bags containing registered mail or money (currently existing in transportation of valuables) and additionally children or elderly people would be possible to track. The system would be very economical if portions of the system could be built on the utilization of partly prior technique and the system in principle having nation-wide coverage and this then further being combined with an intelligent transponder.

In U.S. Pat. No. 4,908,629 is disclosed a microprocessor based transponder for main use in vehicles being activated from the national police headquarters with specifications from the FBI National Crime Information Center register by microwave link to VHF transmitters. Two-way communication on the same frequency with enabling and response. After enabling the transponder transmits ID every tenth second. The transponder may be localized by means of direction-finding equipment in a police car. A limited amount of control information may be transferred to the transponder which however is not applicable for portable use. The drive voltage +12 volts is taken from the supply of the vehicle. In connection with the patent from 1990 it may be noted that the claimed direction-finding equipment was previously published in "73 Magazine" July 1986 by permission of Electronics Australia, February 1986.

Another document, UK Patent Application 2 155 720, concerns a transponder for main use in aircrafts and ships. This system uses two-way communication between the enabling system and the transponder. The localization is obtained by means of a satellite positioning system (NAVSTAR-GPS). No possibility is mentioned for transferring control information to the transponder for this non-portable system.

The document WO, A1 91/19997 concerns a transponder system for essential use in ships, missiles, tanks and other weapons.

Enabling/response takes place in the short wave band, between 4 and 28 MHz, while the positioning takes place by means of GPS. The transponders include readers of, e.g., a so called "smart-card". The response information contains in addition to the position also information from this "smart-card". This system like the previously discussed is also not intended to be portable.

Another additional American patent U.S. Pat. No. 5,032, 845 is concerning a microprocessor controlled transponder having programs in external PROM:s and intended for vehicles. This transponder contains many sensors directly intended for vehicles such as e.g. ignition coil, door contacts etc. It may if required activate main headlights, horn, ignition system. The transponder is provided with a miniaturized remote key pad. A four digit code must be given before the car is started in order not to have the transponder by itself call for attention. Positioning is made by the system LORAN-C (100 kHz). Voltage supply +12 volts is effected from the electric system of the vehicle.

U.S. Pat. No. 4,742,357 concerning a microprocessor controlled (INTEL 8086) transponder primarily conceived for use in vehicles. The transponder is activated from a base station. Positioning is by means of any of or any combination of the four different methods DRT, DST, DDM and LORAN. The system initiates transmission of an alarm message if the unit is loosing communication with the base station, whereby other similar units may relay such an alarm message. Sensors for driver's seat, motion and upon theft, e.g. if desired, a pager may be activated, but the system is not intended to be portable.

EP-0 467 036 A2 concerns a transceiver "tag" intended for identification of objects. The tags are interrogated from a nearby transmitter having an AM-modulated carrier. ID from the tag is sent via an AM-transmitter being keyed on/off. A global interrogation sequence is transmitted to all tags from the interrogator. If these tags lye within the reception range all tags will transmit their response information constituting identification of the responding tag. All interrogated tags transmit on the same frequency. Subsequent to that identity was being transmitted from the tag and received by the interrogator, the interrogator transmits an acknowledgement of tag ID being received. After that acknowledgement has been received by the tag it goes to a standby mode and waits for the next global interrogating sequence from the interrogator. If ID being sent by the tag is not acknowledged by the interrogator the tag will retransmit its identity until acknowledgement is received from the interrogator.

According to the document it can be understood that no position measure is given or any description otherwise localizing the tag, why it may be assumed that the position of the tag therefore is known or that the position has such a character that the position of the tag does not have to be transmitted to the interrogator. Additionally it may be established that the radio receiver portion of the transceiver in the tag is super regenerative. This leads to a great risk of undesired radiation, large bandwidth (i.e. great risk of interference from other transmitters) and relatively low reception sensitivity.

None of the documents demonstrated is offering a system which is applicable for simple surveillance of objects which are easily being moved out of a surveillance area.

DESCRIPTION OF THE INVENTION

The system proposed by us having a small portable/mobile transponder for localization of movable objects is intended to be enabled via an existing paging network having high functionality.

A first purpose of the present invention is to offer a flexible portable system having small dimensions for the marking of objects, e.g. transport bags for valuables, larger valuables, persons/children or certain types of domestic animals (dogs, cats, etc.), for which object it is a desirable to be able to quickly locate this at a certain moment.

A second purpose of the system according to the present invention is aiming to transfer control information via an existing nationwide covering radio system, e.g. a paging system, whereby the position of the transponder does not have to be known at the enabling moment or after an occasion with activation.

A third purpose according to the present invention is that the position of the activated transponder is localized by means of a direction-finding system by means of radio signals being transmitted by the transponder.

The system according to the present invention constitutes an easily portable or mobile system for the localization of movable objects. The transponder contains a receiver, preferably of the type in a paging system, a decoder, a logic unit, a transmitter portion and a power supply. The system is thereby controllable and triggable by means of an existing tested paging radio system. The advantage in using an already existing paging system is partly that the functionality is well tested while providing generally large coverage area is obtained and, additionally, that costs for the building up and operation of such a wide coverage range network will be eliminated.

An additional purpose of the system according to the invention is that the transponder is possible to trigger if the signal from one surveillance transmitter fails to be received during a predefined time interval. In this case a reset of the transponder is achieved only by a disabling command being sent as control information via the paging system to the particular transponder being triggered.

In a particular embodiment system of the surveillance transmitter, this is designed such that it further receives acknowledgement that the system is present within a defined surveillance area.

DESCRIPTION OF THE FIGURES

The invention will be described in form of preferred embodiments by means of the attached drawings, which demonstrate.

EMBODIMENTS OF THE INVENTION

Figure 1:
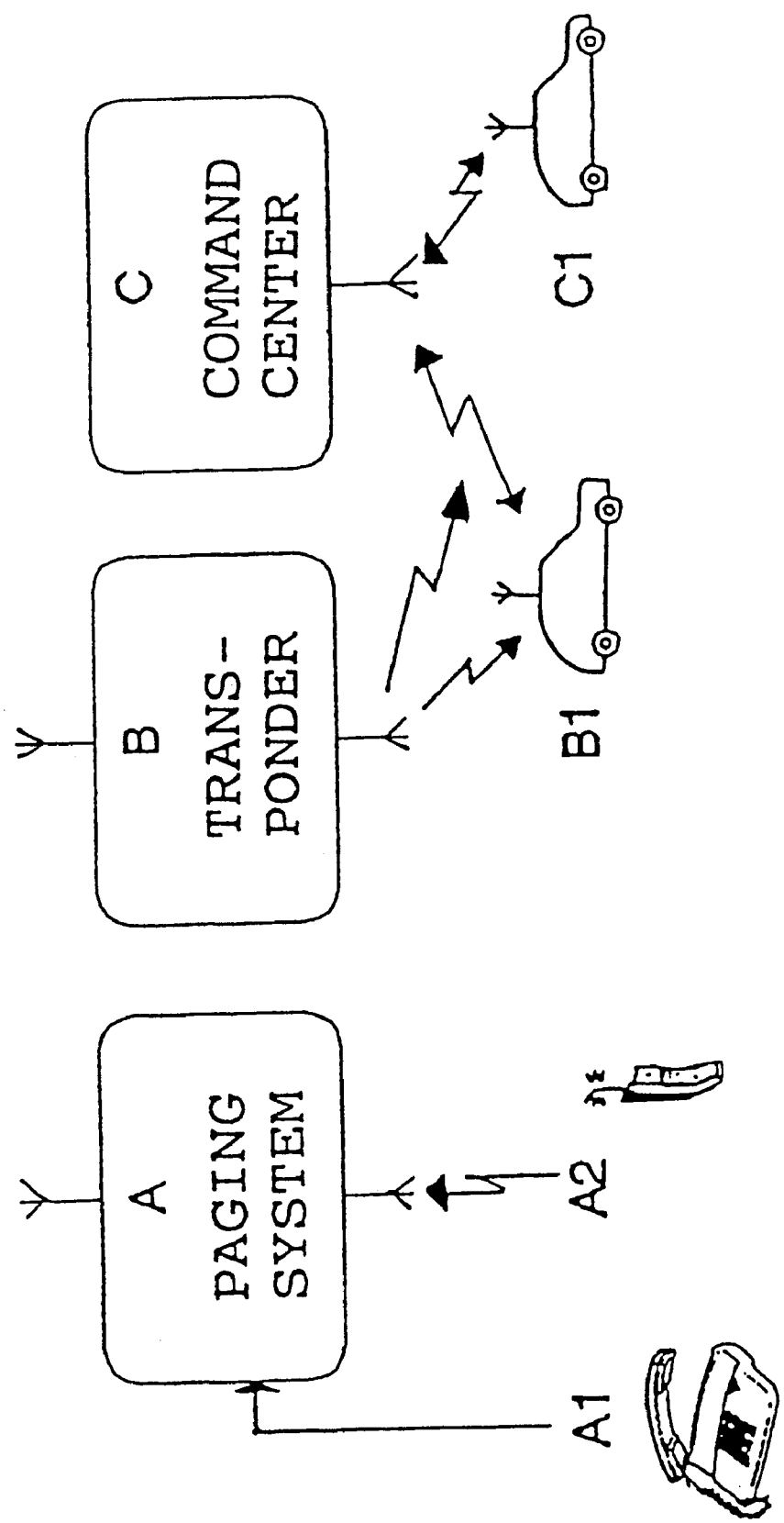
FIG. 1 an embodiment of the present invention together with an activating and localizing system, FIG. 2 a block diagram of the embodiment according to the present invention, FIG. 3 an illustrative system diagram regarding localizing by means of direction-finding of the transponder according to the present invention, and FIG. 4 a system diagram concerning localizing of a transponder according to the present invention by means of information from the GPS system.

FIG. 1 shows an overview of a system B according to the present invention together with a paging system A having enabling units A1 and A2 in form of fixed or mobile telephone sets, and additionally a localizing system consisting of mobile units B1 and B2 and a command center C.

Figure 2:
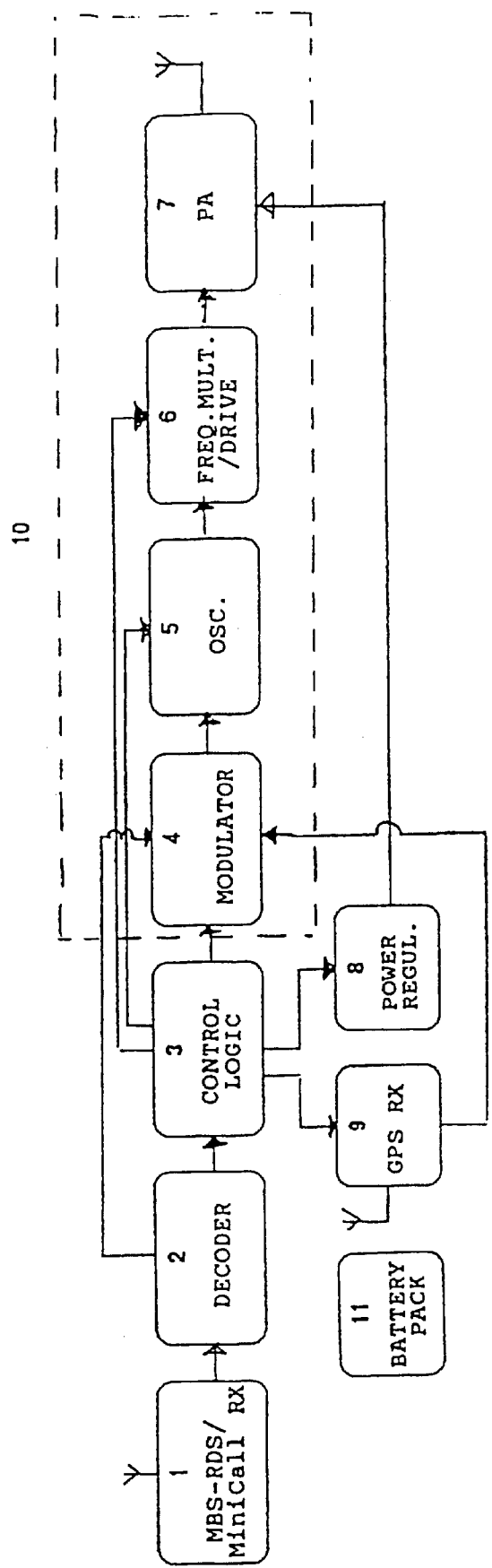

In FIG. 2 is demonstrated in an embodiment the system B in form of a block diagram. The system B comprises, except a battery unit 11 as power supply, a reception device 1 having a built-in antenna for e.g. MBS-RDS/MiniCall, a decoding device 2 and a control logic 3, a transmitter portion 10 comprising a modulator 4, a control oscillator 5, a stage 6 for frequency multiplication and driving and a power amplifier 7 for the outputting of a radio signal onto a transmitting antenna being part of the system. In the embodiment the transmitting antenna due to a filter system is the same as the receiving antenna for the paging receiver. The system B further comprises a stage 8 for power regulation and in a particular embodiment additionally a receiver facility 9 for the satellite positioning system GPS. The control logic 3 in the embodiment is constituted by a conventional low current consuming microprocessor of CMOS type having a control program stored in a conventional low current consuming memory.

Referring to FIG. 2 the transponder receiver 1 is triggered by transmitting over the paging system its call (phone number) together with control information. The control information contains an authorization code, a control code and control data. This is achieved in a customary way preferably by means of a telephone having tone dialing buttons. The authorization code is then decoded by means of the decoder 2. If the authorization code corresponds to the authorization code of the transponder, also the control code and control data will be decoded by the decoder 2. If incorrect authorization code was given no attention is paid to the given control code or control data.

When authorization code corresponds to the transponder authorization code of just the transponder having the given call, the control code and control data decoded by the decoder 2 are transferred to the control logic 3 and thereby further to the predetermined other portions of the system. The control code may, e.g., refer to frequency shift, whereby control data will be given to the oscillator portion 5 and to the frequency multiplying or frequency mixing and amplifying driving stage 6, or control code possibly referring to the enabling of the GPS receiver 9, whereby the GPS receiver is enabled and submits its position, as obtained over the satellite system, to the modulator 4 of the transmitter portion whereby this position will be retransmitted via the antenna by the final amplifier 7. Additionally it is possible to change the transmitter power. A control signal then is given to the power regulator 8 which then controls the amplification of the transmitter final amplifier 7 and consequently the output power of the transmitter 10.

The control information of the embodiment has altogether 14 decimal digits and contains an authorization code, one or more control code(s) and control data. The syntax is described by means of the traditional Backus-Naur Form (BNF). The notation for the communication with the transponder after the call (phone number) is given, will then consequently be:

<control information>::=<authorization code>[<control code>
    [<control data>]]

The authorization code in the embodiment is formed by 4 decimal digits. The remaining information then will contain a maximum of 10 decimal digits, the 4 first decimal digits (corresponding to 3 binary four bit bytes) of which then is the value of the intended control code according to the table above and the remaining 6 decimal digits are control data as required.

The portion of the control information constituting the control code is transmitted to the transponder of the embodiment by means of a 12 bit data word (i.e. three 4 bit bytes) where each control bit controls a certain function according to the following table:

| Control code | Decimal code | Binary code |
| --- | --- | --- |
| Enabling | 0 | 000000000000 |
| Disabling | 1 | 000000000001 |
| Transponder mode | 2 | 000000000010 |
| Frequency shift | 4 | 000000000100 |
| Transmit power low | 8 | 000000001000 |
| Transmit power high | 16 | 000000010000 |
| ID signal time | 32 | 000000100000 |
| Time between $ID_n$ and $ID_{n+1}$ | 64 | 000001000000 |
| Enabling of GPS receiver | 128 | 000010000000 |
| System test | 256 | 000100000000 |
| Reserved for future use | 512 | 001000000000 |
| Reserved for future use | 1024 | 010000000000 |
| Reserved for future use | 2048 | 100000000000 |

It is clear that the position of the control bit set in the data word directly decides which control code is intended, why the decoding becomes particularly elementary.

For the transponder B of the system according to the present invention the enabling sequence takes place in the following way: The transponder B is called over the telephone network from a stationary, mobile or portable telephone A1 or A2, respectively, by utilization of the ordinary system for paging according to the accepted protocol and with the following notation: <address><authorization code> [<control code>[<control data>]] where <phone no.> is a settled address or a call of the transponder and <authorization code> is a unique code for enabling functions of the transponder by means of predetermined control codes according the table above. In certain cases the control code is additionally followed by control data.

In the most simple embodiment the transponder B is enabled in this way upon need, whereafter the transmitter 10 of the transponder regularly will emit a signal on a given frequency having a normal predetermined repetition frequency. This principally occurs in the embodiment having control bit 1 and 2 set to "0". By use of the possibilities of control it is further possible, e.g., to increase the power from the normatively set output power of the transponder B by means of control bit 4 and 5 to a higher power when such a need is present. Additionally it is then easy to change the repetition frequency for the transmitter 10 of the transponder B in a corresponding way by means of control bit 7. In this manner it is possible, by raising the power and simultaneously reducing the repetition frequency for transmission to obtain a larger range, while keeping the total transponder operation time before its battery 11 will run out.

In this more simple embodiment it is then searched for signals from the transponder B on the frequency the transponder transmitter 10 was assigned to in order to localize the object carrying the transponder B as quickly as possible after it being enabled.

When the signal from the transponder is detected the transponder is localized by ordinary direction finding.

In another embodiment the transponder B also comprises a small receiver 9 for the positioning system GPS, this receiver 9 also transferring positioning information obtained via the GPS system to the transponder transmitter 10 via its modulator 4 provided that control bit 8 is set to "1". By this more complex system the position of the transponder B is obtained immediately as soon as the signal from its transmitter 10 is detected.

As a further advantage of the system, due the individualized variability of the transmitting frequency of its transponders, it is possible to use one or more such marking transponders simultaneously, e.g., for a transport of valuables and these transponders will operate independently of each other and their transmitters will not interact since they are directed to different frequencies.

Figure 3:
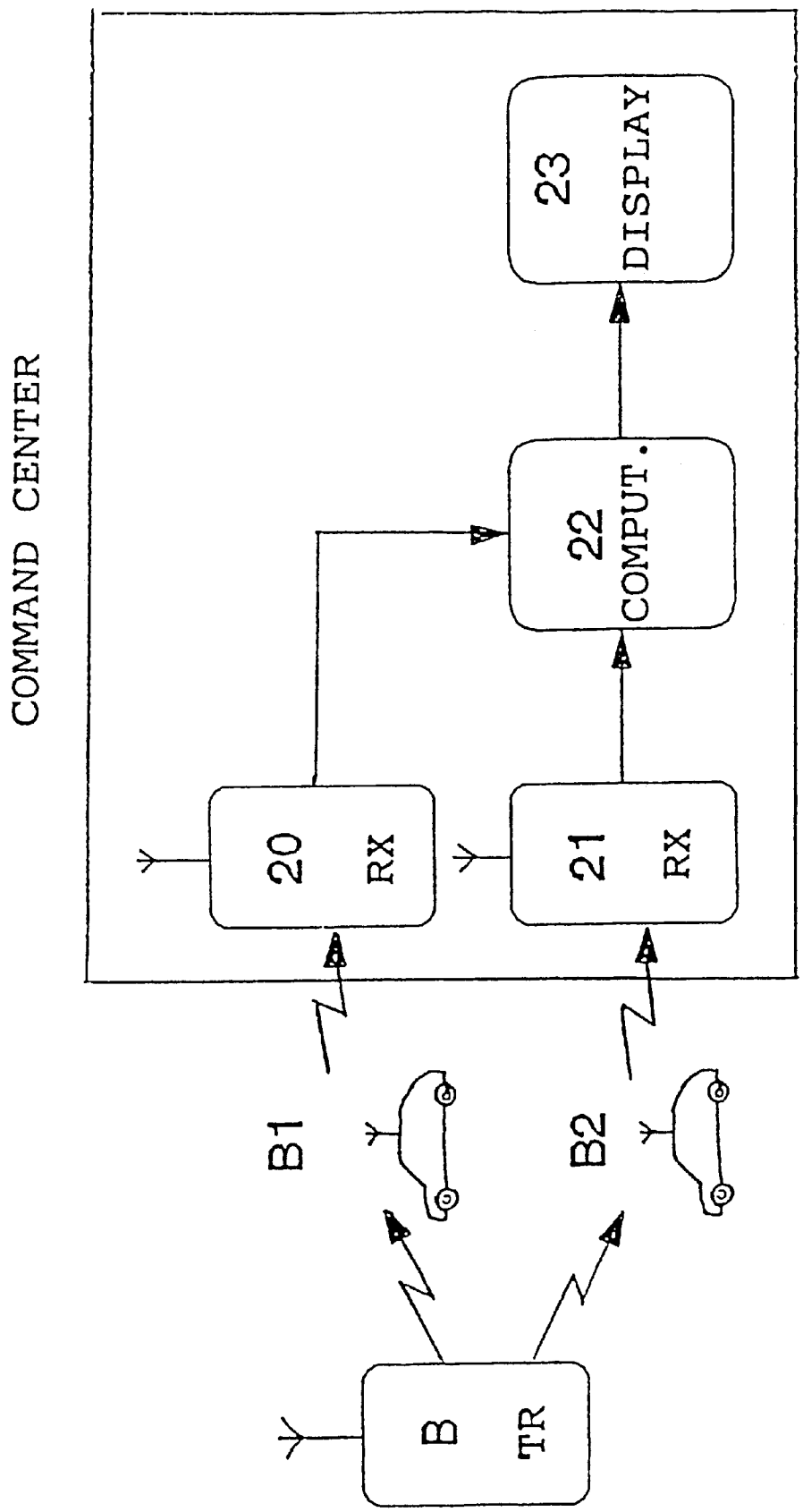

FIG. 3 demonstrates a summary view showing the transponder B and a pair of direction finding vehicles B1 and B2. When the transponder B has been enabled the direction finding may be started. Preferably is used at least two vehicles B1 and B2 to quickly achieve an accurate pinpointing of the mark.

Preferably, the direction finding vehicles continuously transmit information (bearing) and the position of the vehicle to receivers 20 and 21 in a command central connected to a computer system 22, which via a graphic terminal 23 shows a topographical picture (map) of the current area with a mark indicative where the enabled transponder B is expected to be. The mobile units B1 and B2 may then quickly and easily be directed to the current position.

Figure 4:
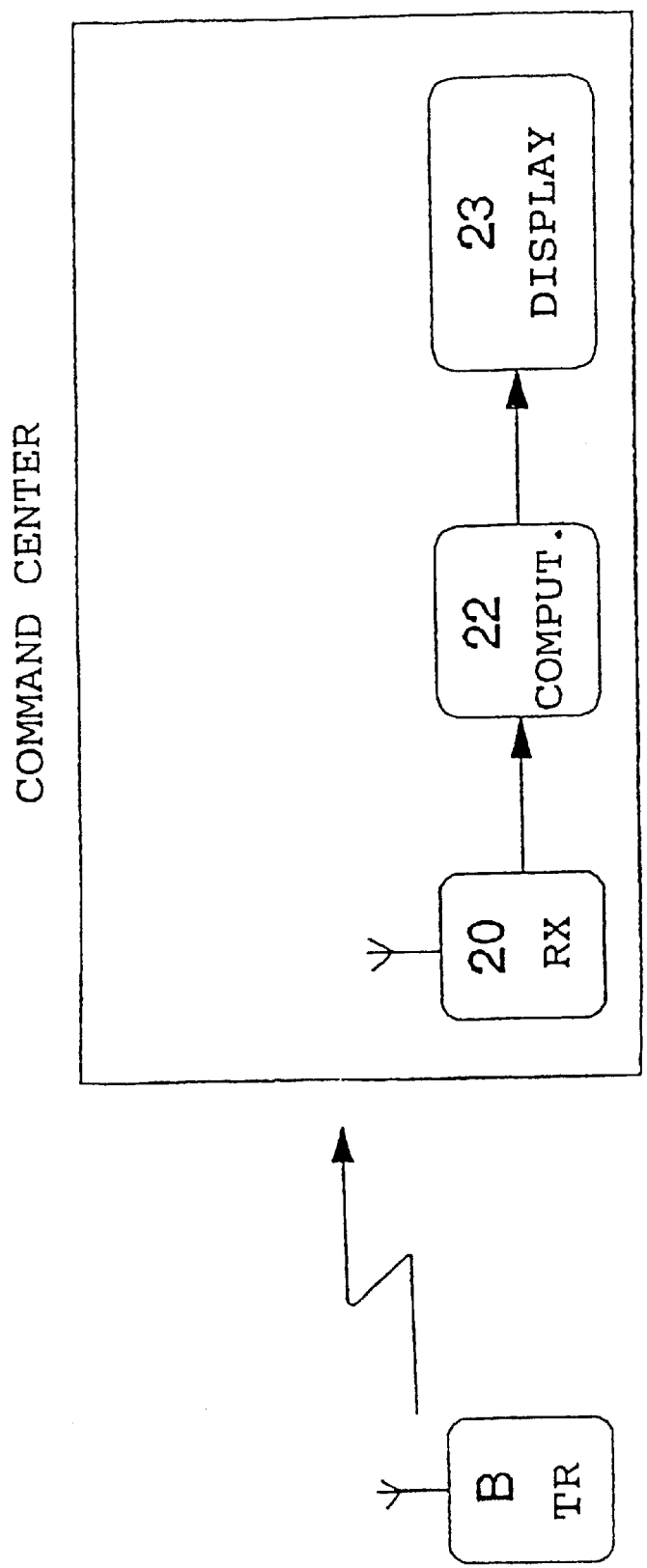

FIG. 4 demonstrates a summary view showing the transponder B and a receiver 20, a computer 22 and a graphic display 23. In this configuration the transponder B also transmits its current position which then is obtained from a built-in receiver 9 for the GPS system. The position then transferred from the transponder B to the receiver 20 is processed by the computer 22 and the position is graphically presented by means of the display 23, whereby mobile units, e.g., B1 and B2 according to FIG. 3 quickly and easily are directed to the current position.

In most cases when the enabling of such a transponder B fixed onto or inside an object takes place, the position of the object is normally known within a precision of some or a few kilometers, why the probability of immediately detecting the signals from the transponder 10 is very high. The transmitter 10 of the transponder in the embodiment is operating on a frequency preferably of the order of 1000 MHz, while its receiver 1 for the enabling signal operates within the ordinary FM band 88–104 MHz (MBS-RDS) and/or e.g. around 170 MHz (MiniCall).

In a further variant of the transponder B the transmitter 10 is made such that it besides transmitting in the UHF frequency band preferably around 1000 MHz also is able to emit a frequency in the HF band preferably around 30–50 MHz to further assist the direction finding in areas where reflections, e.g., off different buildings etc., may provide difficulties in the direction finding of its UHF signal. This frequency is in this case obtained directly from the oscillator 5 by not utilizing the frequency multiplication or the frequency mixing of the function block 6.

The total transponder device B will by utilization of modern integrated technique have a very compact size, and will additionally by utilization, e.g., of conventional CMOS technique, have a very low power consumption in standby, i.e. having only its paging receiver 1 enabled. In this mode its small battery 11, preferably of mercury or lithium type, will easily last several months. Due to this small size it is then suitable also, e.g., for surveillance of people or animals, e.g., persons suffering from senile dementia, or valuable animals, e.g., a riding horse, since it is light-weight and since it is easy to hide the device due to its limited size.

EMBODYING APPLICATION EXAMPLES

In for example the tracking of valuable transport goods one or several transponders are placed together with the valuable goods, e.g., in a bag for money. Such small transponders are easily located with the valuable goods by, e.g., banking staff. The transponder B or the transponders at this occasion is/are in standby, i.e., it or they will not be ransmitting any information and the power consumption consequently will be very small as only the receiver 1 for MBS-RDS/MiniCall needs to be in its receiving state.

Upon theft of the valuable transport goods enabling is automatically performed in a third embodiment according to the present invention if the valuable goods containing the transponder is put outside a defined surveillance area. Enabling of for example the transponder B will occur when a signal coming from a given surveillance transmitter, preferably around 170 MHz (MiniCall), is not repeatedly received within a predetermined time period.

In all embodiments it is additionally possible to, via the paging network, enable the respective transponder B manually by means of a stationary or mobile telephone, A1 and B1, respectively, dialing its unique phone number and additionally then give the unique authorization code of the transponder. If only the authorization code of the transponder is given without control code, which is equal to that the control code being equal to "0", the transponder B will transmit its identity with a certain predetermined repetition frequency having interval and power predetermined by its control logic 3 due to that the control logic also automatically setting control bit 1 in the control code equal to "0", whereby the transponder is enabled.

The transponder B additionally operates in a mode of a further embodiment where its transmitter 10 alternatingly transmits on a fixed predetermined frequency within the mobile radiotelephone band in addition to its ordinary assigned transponder frequency. In this mode in the embodiment the control bit 2 is set to "1". On the mobil radiotelephone frequency the transponder B then sends its identity according to a given protocol to a nearby base station in the mobile radiotelephone network. A mobile radiotelephone system of type NMT then permits that information is obtained about in which mobile radiotelephone network cell this enabled transponder B is localized. Even if several transponders are enabled within the same area this is of no importance, as every transponder B has its own unique address (phone number) to transfer in such a case to the mobile radiotelephone system. This means that it is possible to immediately direct direction finding vehicles, e.g., B1 and B2 to the appropriate area to localize the enabled transponder B.

If the transponder B is not furnished with a frequency for the mobile radiotelephone band the enabled transponder is localized through ordinary position finding where initially, the latest known position of the transponder is used. If it is not immediately possible to detect any frequency emitted from the transponder the transponder B is called up again over the telephone network and a new <authorization code>[<control code>[<control data>]] is given whereby the control code will be allowed to effect the output power of the transponder to be raised by preferably setting control bit 5 to "1" (decimal 16) and whereby eventually at the same time the time period between transmissions, i.e. the transmission sequence, will be limited, by means of the setting of control bit 7 to the value of "1", corresponding the decimal code 64 and an additional simultaneous adding of further corresponding control data. Due to the structure of the control code having predetermined control bits for different functions this may be performed immediately by one single command to the transponder.

In a corresponding way a transponder B is disabled by sending new <authorization code>[<control code>[<control data>]] where control bit 1 is set to "1" in the control code. When the transponder B receives a control code having control bit 1 set to "1", normally all other bits are set to "0" for the functions of the table demonstrated above. By setting control bit 9 to "1", test of the system and the logic unit and other included blocks, e.g. 4–8, may be performed by means of built-in test routines.

The utilized technique further means that all control codes being sent to the transponder B over the paging system and not having the control bit 1 set, will accordingly always enable the transponder, why for the different embodiments it is sufficient to send the authorization code in order to enable the transponder. This principle somewhat modified is for example also utilized in the previously mentioned second embodiment where the transponder B senses a transmitter within a surveillance area. If this transmitter does not within a certain time period transmit a signal to keep control bit 1 set, the transponder is automatically enabled by theft of the object when it is taken beyond the range of the surveillance transmitter. This is done according to conventional technique in that the control logic is having a time function which after a predetermined time period sets this control bit 1 to "0" if the signal from the surveillance transmitter is not detected.

What is claimed is:

1. A transponder system (B) for localization of an object being provided with a transponder for this system comprising antenna device and a paging receiver (1) having an unique call, further comprising a built-in marker transmitter (10) having a standby mode, and a working enabling mode during which said marker transmitter (10) is working on a fixed frequency different from the frequency of the paging receiver (1), a unit (2) for decoding of an authorization code and a control information obtained via the paging receiver (1), an electronic logic unit (3) for processing of control information obtained from the decoder (2), a power supply (11) to permit the transponder system (B) and its marker transmitter (10) to operate during a certain minimum time period during the enabling mode, and that operation of the marker transmitter (10) during the enabling mode is controlled by the logic unit (3) based on remotely transmitted control information obtained from the paging receiver (1) via the unit (2) for decoding.

2. The transponder system according to claim 1, characterized in that the logic unit (3) looks for the authorization code in the data information obtained by the decoder unit (2) which information is transferred by the use of calling telephone's dialing buttons and received by the paging receiver (1) in question, that when the logic unit (3) finds an authorization code being valid for the paging receiver (1) in question having the unique call it will further process data information sent over the telephone network and received by the paging receiver (1) over a radio paging network.

3. The transponder system according to claim 2, characterized in that said marker transmitter (10) is operating in the range preferably around 1000 MHz, that said marker transmitter (10) additionally comprises a fixed frequency within the mobile radiotelephone band, said marker transmitter (10) when enabled in such a mode alternatingly transmitting a defined identification on the fixed frequency in the mobile radiotelephone band and alternatingly is transmitting on its ordinary defined different frequency for direction finding purposes, whereby a further rough information is obtained abut the location where close positioning finding should take place due to the recognition of the network cell of the mobile radiotelephone system where said transponder (B) is localized.

4. The transponder system according to claim 2, characterized in that said marker transmitter (10) is additionally comprising a transmitting frequency preferably in the range 30–50 MHz and transmitted via its ordinary antenna or an extra connected antenna to further facilitate direction finding within areas having strong reflections in the UHF range where the ordinary marker frequency is transmitted.

5. The transponder system according to claim 2, characterized in that the additionally obtained data information constitutes control information for the marker transmitter (10), which information primarily via the electronic logic unit (3) enables or disables the marker transmitter (10).

6. The transponder system according to claim 5, characterized in that said marker transmitter (10) is operating in the range preferably around 1000 MHz, that said marker transmitter (10) additionally comprises a fixed frequency within the mobile radiotelephone band, said marker transmitter (10) when enabled in such a mode alternatingly transmitting a defined identification on the fixed frequency in the mobile radiotelephone band and alternatingly is transmitting on its ordinary defined different frequency for direction finding purposes, whereby a further rough information is obtained abut the location where close positioning finding should take place due to the recognition of the network cell of the mobile radiotelephone system where said transponder (B) is localized.

7. The transponder system according to claim 6, characterized in that said marker transmitter (10) is additionally comprising a transmitting frequency preferably in the range 30–50 MHz and transmitted via its ordinary antenna or an extra connected antenna to further facilitate direction finding within areas having strong reflections in the UHF range where the ordinary marker frequency is transmitted.

8. The transponder system according to claim 5, characterized in that said control information further is comprising for one part a number of symbols which is defining a certain basic function of said marker transmitter (10), while the remaining decoded symbols constitute additional control information for this specific function in form of control data, at least the frequency, transmit power and transmitting sequence of the enabled marker transmitter accordingly being controllable.

9. The transponder system according to claim 8, characterized in that said marker transmitter (10) is operating in the range preferably around 1000 MHz, that said marker transmitter (10) additionally comprises a fixed frequency within the mobile radiotelephone band, said marker transmitter (10) when enabled in such a mode alternatingly transmitting a defined identification on the fixed frequency in the mobile radiotelephone band and alternatingly is transmitting on its ordinary defined different frequency for direction finding purposes, whereby a further rough information is obtained abut the location where close positioning finding should take place due to the recognition of the network cell of the mobile radiotelephone system where said transponder (B) is localized.

10. The transponder system according to claim 8, characterized in that said marker transmitter (10) is additionally comprising a transmitting frequency preferably in the range 30–50 MHz and transmitted via its ordinary antenna or an extra connected antenna to further facilitate direction finding within areas having strong reflections in the UHF range where the ordinary marker frequency is transmitted.

11. The transponder system according to claim 8, characterized in that when said transponder (B) is receiving a call having a correct authorization code but no other data information said marker transmitter (10) always being enabled by said logic unit (3) through predetermined settings.

12. The transponder system according to claim 11, characterized in that said marker transmitter (10) is operating in the range preferably around 1000 MHz, that said marker transmitter (10) additionally comprises a fixed frequency within the mobile radiotelephone band, said marker transmitter (10) when enabled in such a mode alternatingly transmitting a defined identification on the fixed frequency in the mobile radiotelephone band and alternatingly is transmitting on its ordinary defined different frequency for direction finding purposes, whereby a further rough information is obtained abut the location where close positioning finding should take place due to the recognition of the network cell of the mobile radiotelephone system where said transponder (B) is localized.

13. The transponder system according to claim 12, characterized in that said marker transmitter (10) is additionally comprising a transmitting frequency preferably in the range 30–50 MHz and transmitted via its ordinary antenna or an extra connected antenna to further facilitate direction finding within areas having strong reflections in the UHF range where the ordinary marker frequency is transmitted.

14. The transponder system according to claim 11, characterized by further comprising an additional receiver (9) for the GPS system which receiver is being enabled parallelly to said marker transmitter (10), in that received positioning information from said GPS receiver (9) is modulating said marker transmitter (10) for retransmission of the current position of said transponder (B).

15. The transponder system according to claim 14, characterized in that said marker transmitter (10) is operating in the range preferably around 1000 MHz, that said marker transmitter (10) additionally comprises a fixed frequency within the mobile radiotelephone band, said marker transmitter (10) when enabled in such a mode alternatingly transmitting a defined identification on the fixed frequency in the mobile radiotelephone band and alternatingly is transmitting on its ordinary defined different frequency for direction finding purposes, whereby a further rough information is obtained abut the location where close positioning finding should take place due to the recognition of the network cell of the mobile radiotelephone system where said transponder (B) is localized.

16. The transponder system according to claim 14, characterized in that said marker transmitter (10) is additionally comprising a transmitting frequency preferably in the range 30–50 MHz and transmitted via its ordinary antenna or an extra connected antenna to further facilitate direction finding within areas having strong reflections in the UHF range where the ordinary marker frequency is transmitted.

17. The transponder system according to claim 1, characterized in that said marker transmitter (10) is operating in the range preferably around 1000 MHz, that said marker transmitter (10) additionally comprises a fixed frequency within the mobile radiotelephone band, said marker transmitter (10) when enabled in such a mode alternatingly transmitting a defined identification on the fixed frequency in the mobile radiotelephone band and alternatingly is transmitting on its ordinary defined different frequency for direction finding purposes, whereby a further rough information is obtained about the location where close positioning finding should take place due to the recognition of the network cell of the mobile radiotelephone system where said transponder (B) is localized.

18. The transponder system according to claim 17, characterized in that said transponder (B) identifies itself to the mobile radiotelephone system by utilizing its unique call, preferably in form of its phone number, whereby an enabled transponder (B) is simply identified by an existing mobile radiotelephone network.

19. The transponder system according to claim 17, characterized in that said marker transmitter (10) is additionally comprising a transmitting frequency preferably in the range 30–50 MHz and transmitted via its ordinary antenna or an extra connected antenna to further facilitate direction finding within areas having strong reflections in the UHF range where the ordinary marker frequency is transmitted.

20. The transponder system according to claim 1, claims, characterized in that said marker transmitter (10) is additionally comprising a transmitting frequency preferably in the range 30–50 MHz and transmitted via its ordinary antenna or an extra connected antenna to further facilitate direction finding within areas having strong reflections in the UHF range where the ordinary marker frequency is transmitted.

* * * * *